United States Patent [19]

Matsuki et al.

[11] Patent Number: 5,253,822
[45] Date of Patent: Oct. 19, 1993

[54] TAPE CARTRIDGE HAVING A NAME PLATE WITH AN INDEX FORMED THEREON

[75] Inventors: Tadao Matsuki, Tokyo; Nobutaka Miyazaki, Otokuni; Osamu Yamamoto, Takatsuki, all of Japan

[73] Assignee: Hitachi Maxell, Ltd., Ibaraki, Japan

[21] Appl. No.: 569,904

[22] Filed: Aug. 20, 1990

[30] Foreign Application Priority Data

Aug. 22, 1989 [JP] Japan ............................. 1-97586[U]

[51] Int. Cl.⁵ ............................................. G11B 23/38
[52] U.S. Cl. ...................................................... 242/199
[58] Field of Search ............... 242/197, 198, 199, 200; 360/132; 206/387, 389; D14/121

[56] References Cited

U.S. PATENT DOCUMENTS

| 3,718,290 | 2/1973 | Wright | 242/199 |
| 4,304,331 | 12/1981 | Minkow | 242/199 X |
| 4,570,877 | 2/1986 | Oishi et al. | 242/199 |

FOREIGN PATENT DOCUMENTS

| 0126539 | 11/1984 | European Pat. Off. | 360/132 |
| 0416579 | 3/1991 | European Pat. Off. | 360/132 |
| 2065757 | 9/1975 | Fed. Rep. of Germany | 242/199 |
| 2559763 | 11/1977 | Fed. Rep. of Germany | 242/199 |
| 2716725 | 10/1978 | Fed. Rep. of Germany | 242/199 |
| 2292310 | 6/1976 | France | 360/132 |
| 2512254 | 3/1983 | France | 242/199 |
| 525469 | 10/1978 | Japan | 360/132 |
| 55176787 | 6/1982 | Japan | 360/132 |
| 8002757 | 12/1980 | World Int. Prop. O. | 360/132 |

Primary Examiner—Daniel P. Stodola
Assistant Examiner—John P. Darling
Attorney, Agent, or Firm—Birch, Stewart, Kolasch & Birch

[57] ABSTRACT

A case body composed of upper and lower halves having a main wall in which there is defined at an intermediate portion thereof a pair of drive shaft insertion holes in right and left portions thereof, and the case body includes two pairs of upper and lower flange members inwardly projected from inner peripheral portions of the drive shaft insertion holes continuous with the main wall. A name plate made of a materials harder than the plastic material of the case body, is attached to an outer surface of the main wall including the right and left drive shaft insertion holes, and the name plate has one or more indexes formed on the outer surface thereof and has a pair of right and left shaft insertion openings defined therein. The positions of the shaft insertion openings correspond to the drive shaft insertion holes defined in the case body.

12 Claims, 5 Drawing Sheets

TAPE CARTRIDGE HAVING A NAME PLATE WITH AN INDEX FORMED THEREON

BACKGROUND OF THE INVENTION

1. Field of the Invention

The present device relates to a tape cartridge, more particularly to a tape cartridge and having a name plate attached onto a surface of a case body.

2. Description of the Related Art

Generally, on an outer surface of a tape cartridge, there are attached or formed various indexes indicating a special feature such as length of a tape, and indicating a source of a tape cartridge such as a trade name or maker's name.

In the Japanese Utility Model Publication Sho 58-52690, for example, it is disclosed that, on the outer surface of the case body there is attached an index printed label indicating a source and/or special feature of a tape cartridge. Moreover, in this Utility Model, it is proposed to print a lot number index, the contents of which may be altered, on the outer surface of the case body through a hot stamp process or a silk-screen process.

In addition, the Japanese Utility Model Publication Sho 59-142984 discloses a specific indicating method for forming various indexes on the outer surface of the case body with plastic materials of different colors through a bicolor molding process.

In the conventional indication methods, there has been formed an index on the surface of the case body mainly through a printing process. However, in such a printed index of characters or designs, it becomes hard to read the index when the printed index is defaced due to contact with other members, resulting in lack of durability. Moreover, the printed index formed directly on the surface of the case body is apt to be defaced and unreadable when the printed index is contacted with a solvent, resulting in lack of chemical-durability. Since printing techniques have been widely developed, there has grown a problem that it has become make forged products, such as copying products without permission, or inferior articles.

In the indication method employing the bicolor molding process, although the problems mentioned above can be solved, it is difficult to change or renew the indexes. Moreover, there has been a disadvantage that the production cost of the mold is so expensive that the bicolor molding process is of no practical use, even in a commercialized tape cartridge with a predetermined identification number as an index.

In particular, in the conventional tape cartridge, there is formed an index on the outer surface of the case body for indicating, at most, lot numbers, but there has not been formed an index of an identification production number which is different and peculiar to every tape cartridge because of a high cost of a variable index.

Moreover, in the conventional tape cartridge, the printed index label or the like does not have a positive function of supplementing inferior of mold preciseness of the case body and improving the mechanical strength thereof.

SUMMARY OF THE INVENTION

An essential object of the present invention is to provide a tape cartridge at a low price having an index indicating an identification production number which is peculiar to every tape cartridge.

Another object of the present invention is to provide a tape cartridge using a name plate having various indexes formed thereon, wherein the molding inferiority or thermal deformation due to the molding of a case body, especially in a peripheral portion surrounding a drive shaft inserting hole is corrected and the mechanical strength required for the corresponding peripheral portion can be improved when necessary.

Figure 1:
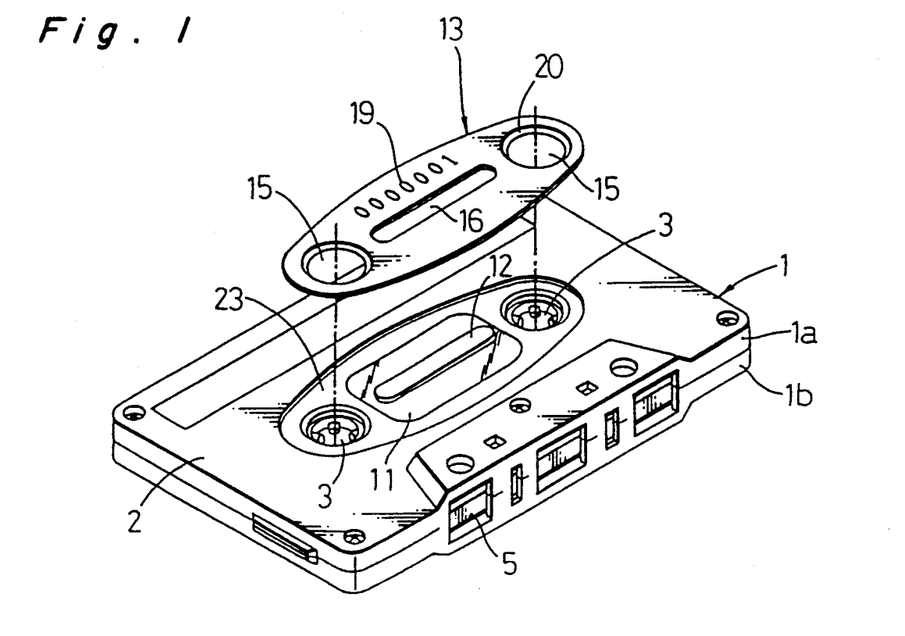
FIG. 1 is an exploded perspective view of a tape cartridge according to the present invention.
Figure 2:
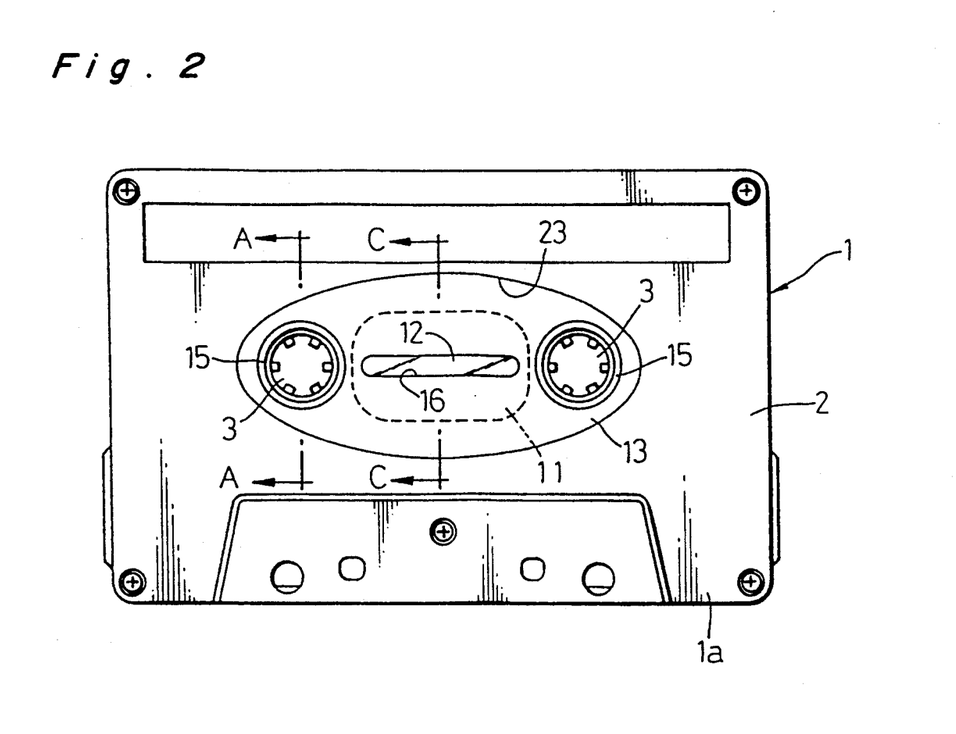
FIG. 2 is a plan view.

One aspect of the present invention is that there is formed a metallic name plate 13 having an index 19 indicating at least an identification production number peculiar to every cartridge case, and the name plate 13 is bonded to the outer surface of the case body 1, as shown in FIG. 1. Herein, the identification production number index 19 of Arabic numerals in many cases means that the production number is different from each other and peculiar to every name plate 13 and is different from the production lot number. Moreover, when a pair of name plates 13, 13 having indexes 19, 19 indicating a production number are bonded to both of the outer surfaces of top and bottom main walls 2, 2 of the upper and lower halves 1a and 1b of a tape cartridge, the indexes 19, 19 of the production number may be the same in both of the name plates 13. In other words, this is all right so long as the production number index 19 is peculiar to every tape cartridge.

A pair of drive shaft insertion holes 3 are formed in a manner so as to pass through the right and left portions in the central portion of the main walls 2 of the upper and lower halves 1a and 1b of the case body 1 made of plastic material. There are inwardly projected two pairs of upper and lower flanges 7 (FIG. 3) from the main walls 2 as one body with the inner side walls of the drive shaft insertion holes 3. There are provided a pair of right and left hubs 6, 6 (FIG. 6) winding a tape 5 therebetween corresponding to the positions of the drive shaft insertion holes 3 and 3 so that the right and left hubs 6, 6 are rotatably disposed and regulated between the upper and lower flanges 7, 7 in the case body 1.

Therefore, the required aspects of the tape cartridge of the present invention are briefly described in (1) to (3) as follows:

(1) A hard solid name plate 13 is fixed to the outer surface of the main wall 2 of the case body 1 including a pair of drive shaft insertion holes 3, 3;

(2) There are formed various indexes on the surface of the name plate 13;

(3) The name plate 13 has a pair of right and left drive shaft insertion openings 15, 15 defined through the plate member corresponding to the right and left drive shaft insertion holes 3, 3.

Herein the hard solid state of the name plate 13 means that the name plate 13 is desirably made of a hard material, harder than the plastic material forming the case body 1, but it is not limited to this and it is not necessary to form the name plate 13 made of metallic material. Moreover, the index to be formed on the name plate 13 is not limited to the production number 19, and other indexes may be formed on the name plate 13.

Furthermore, it is desired that, the name plate 13 be fixed to the outer surface of the main wall 2 in such a manner that there are projected a pair of ring shaped shaft guide members 20, 20 each having a taper shaped guide surface 20a inclined inwardly at the free end portion thereof from the inner peripheral side wall of the shaft insertion opening 15 and this shaft guide member 20 is engaged in contact with at least the inner peripheral portion of the drive shaft insertion hole 3 or flange portion 7.

The name plate 13, made of metal, facilitates the formation of the index of the identification production number 19 peculiar to the individual name plate 13, and the metallic name plate 13 may be easily fixed to the outer surface of the case body 1 after the case body 1 is assembled. Whereby, in spite of the fact that the case body 1 has a fixed form, each of the tape cartridges has an individual name plate 13, with its identification production number 19 peculiar to the tape cartridge.

The entire part of the case body 1 is formed by the molding of plastic materials in order to facilitate mass production of the tape cartridge, even though the case body 1 has a complicated inner structure. In particular, since the flange portions 7 are integrally formed on the inner peripheral portions of the drive shaft insertion holes 3, as one body with the main walls 2 of the case body 1 by the molding of plastic materials for defining the positions of the hubs 6, the facilitation of the molding of the case body 1 is maintained, and the hub 6 is prevented from direct contact with the hard name plate 13 so as to reduce the sliding resistance between the hub 6 and the case member.

According to a feature of the present invention, since there is defined a pair of right and left shaft insertion openings 15, 15 in the name plate 13 corresponding to the drive shaft insertion holes 3, 3, defined in the case body 1, the distance between the center axes of the right and left shaft insertion openings (15, 15) can be secured with constant accuracy, and one name plate 13 may be fixed to any one of the top and bottom main walls 2, thereby improving the workability of attachment of the name plate 13 to the case body 1.

The shaft guide member 20 provided in the inner peripheral portion of the shaft insertion opening 15 guides a drive shaft provided in a deck to be inserted in the drive shaft insertion hole 3 defined in the case body 1, so that a drive shaft is engaged with the hub 6. Also, since the shaft guide member 20 is engaged in contact with the flange portion 7 or the inner peripheral portion of the drive shaft insertion hole 3, the shaft guide member 20 acts as a splint to the root of the flange 7 inwardly projected from the inner peripheral portion of the drive shaft insertion hole 3, thereby preventing the occurrence of a crack in the root portion of the flange 7 caused by a shock load when the hub 6 collides with the flange 7 when dropping the tape cartridge or the like.

According to a feature of the present invention, there is provided a metallic name plate member 13 other than a member of the case body 1, and an identification production number index 19 is formed on the outer surface of the name plate 13, thereby enabling mass production of the tape cartridge at a low price. Moreover, since the production number index 19 is formed in three-dimension forming a striking contrast, the index 19 is hard to be wear out due to contact with other members, improving the durability of the index 19. When the name plate 13 is fixed to the case body 1, the tape cartridge with the name plate 13 has an identification index 19 of a peculiar production number, so that forged articles can be immediately recognized. The user can take advantage of the index 19 for identifying his own tape cartridge from others, thereby improving identification peculiarity of a tape cartridge.

According to another feature of the present invention, the case body 1, including upper and lower halves 1a and 1b, a pair of drive shaft insertion holes 3 and flange members 7, is formed by molding with plastic materials. Therefore, even though the case body 1 has a complicated structure, the case body 1 can be mass-produced at a low price. Also, the hub 6 slidably rotates in contact with the inner surface of the main wall 2 or with the flange 7, thereby preventing the defacement of the hub 6.

On the other hand, the hard name plate 13, made of metallic materials, is fixed to the outer surface of the upper or lower main wall 2 including the right and left drive shaft insertion holes 3. Therefore, by selecting the material of the name plate 13 appropriately, the intermediate portion of the main wall 2, including the drive shaft insertion holes 3 having a low degree of mechanical strength can be preferably reinforced, if necessary.

The name plate 13 has a pair of shaft insertion openings 15, 15 defined in the portions corresponding to the right and left drive shaft insertion holes (3, 3) and has ring shaped shaft guide members 20 projected as one body with the inner peripheral portions of the shaft insertion openings 15, 15. In other words, the flange member 7 is not included in the name plate 13. Therefore, the shape and size of the diameter of the shaft insertion opening 15, including the shaft guide member 20, can be molded with high accuracy and, also, the distance between the center axes of both shaft inserting openings 15, 15 can be defined with high accuracy. Moreover, even under the condition of high temperature, the coefficient of thermal expansion of the name plate 13 made of such a metallic material can be made smaller than that of the case body 1 made of the plastic material. Therefore, the size accuracy of the name plate 13 can be secured against thermal variation. Accordingly, even though there occurs poor accuracy or thermal deformation due to molding of the peripheral portion of the drive shaft insertion holes 3, including the flange member 7 or in the distance between the center axes of the right and left drive shaft insertion holes 3, 3 in the case body 1, the inaccuracy or deformation can be mended by providing the name plate 13.

In addition, according to a further feature of the present invention, since the entrance peripheral portions of the drive shaft insertion holes 3, 3 are provided with the shaft guide member 20 of the name plate 13, the drive shafts provided in the deck can be securely inserted in the drive shaft insertion holes 3, 3 through the taper shaped guide surfaces 20a of the shaft guide members 20. Moreover, even though the hub 6 collides against the flange 7 when dropping the tape cartridge, since the shaft guide member 20 of the name plate 13 is provided on the ring shaped flange member 7, the shaft guide member 20 supports the ring shaped flange member 7, thereby preventing the damage thereof.

BRIEF DESCRIPTION OF THE DRAWINGS

The present invention may be better understood with reference to the following drawings, wherein.

DETAILED DESCRIPTION OF THE INVENTION

A Philips type tape cartridge will be described as a first embodiment of the present invention with reference to FIGS. 1 to 7.

Figure 7:
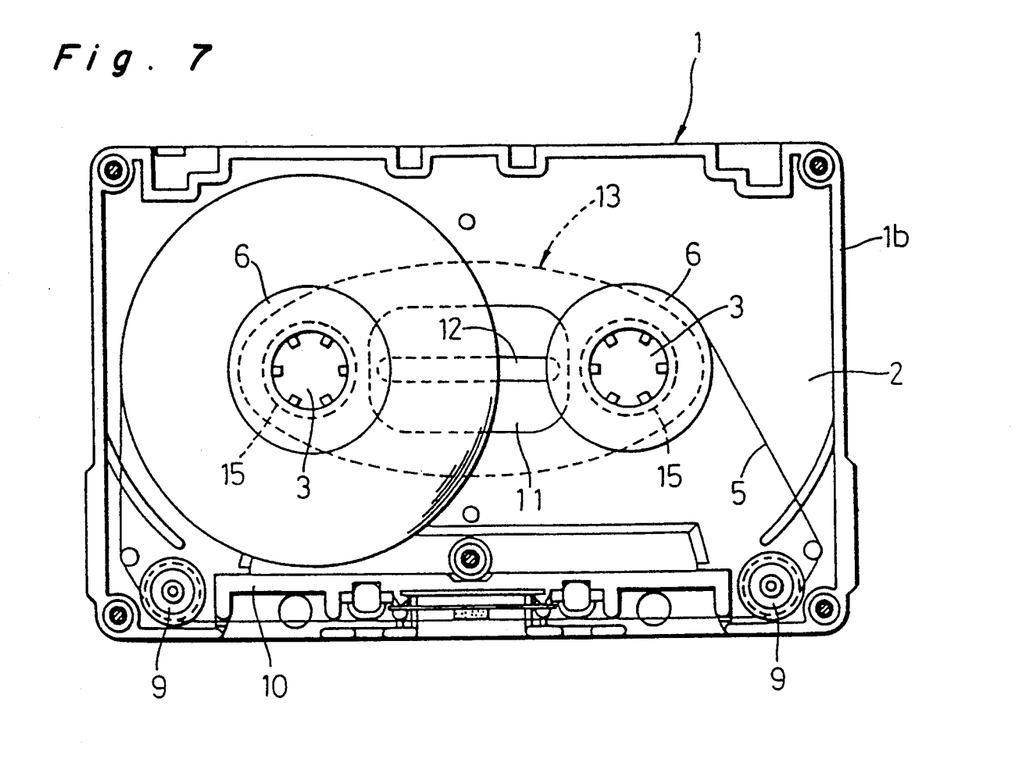
FIG. 7 is a plan view showing an entire part of the inside of the tape cartridge.

In FIGS. 1 and 7, a case body 1 is composed of upper and lower halves 1a and 1b which are combined with each other in a lid abutting manner using screws, the case body 1 being made of plastic material.

The upper and lower halves 1a and 1b of the case body 1 respectively comprise top and bottom main walls (2, 2) each having a pair of right and left drive shaft insertion holes 3 defined in the intermediate right and left portions thereof in a manner penetrating throughout the main walls 2. A pair of right and left hubs 6 for winding a tape 5 are rotatably installed in the portions corresponding to the drive shaft insertion holes 3 in the case body 1.

In the inner surfaces of the top and bottom main walls 2, there are provided ring shaped flange members 7 projected inwardly from the inner peripheral portions of the drive shaft insertion holes (3, 3) as one body with the main walls 2. The inner peripheral surface of each of the hubs 6 is engaged in contact with the outer peripheral surface of the ring shaped projected member of the flange 7 so that the displacement of the hub 6 in the diameter direction can be regulated by the abutment therebetween.

As shown in FIG. 7, there are provided tape guide rollers 9, 9 in the right and left front portions in the case body 1 and also there is provided a tape guide block member 10 made of plastic material other than the case body member in the intermediate front portion in the case body 1 and the tape guide block member 10, is secured between the upper and lower halves 1a and 1b. The tape 5, fed out from one of the hubs 6, is introduced to the front portion of the case body 1 through one of the guide rollers 9, thereafter the tape 5 is taken up to be wound onto the other hub 6 through the other tape guide roller 9.

Figure 5:
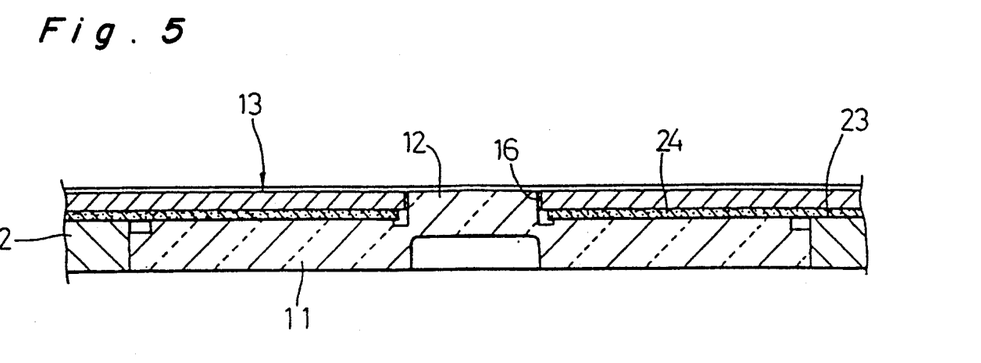
FIG. 5 is a sectional view cutting along the line C—C in FIG. 2.

In the main wall 2 of the case body 1, between the right and left drive shaft insertion holes 3, 3 in the intermediate portion thereof, there is provided a transparent window plate 11 through which the state of the wound tape can be seen. The transparent window plate 11 is integrally formed of transparent plastic material as one body with the main wall 2 through bicolor molding of the upper and lower halves 1a and 1b. That is to say, the main body of the upper and lower halves 1a and 1b is primarily molded with opaque plastic material, thereafter the transparent window plate 11 is secondarily molded with a transparent plastic material. In the intermediate portion of the window plate 11, there is formed a convex portion 12 elongated in the right to left direction, projected outward from the window plate 11, as shown in FIGS. 1 and 5.

Figure 6:
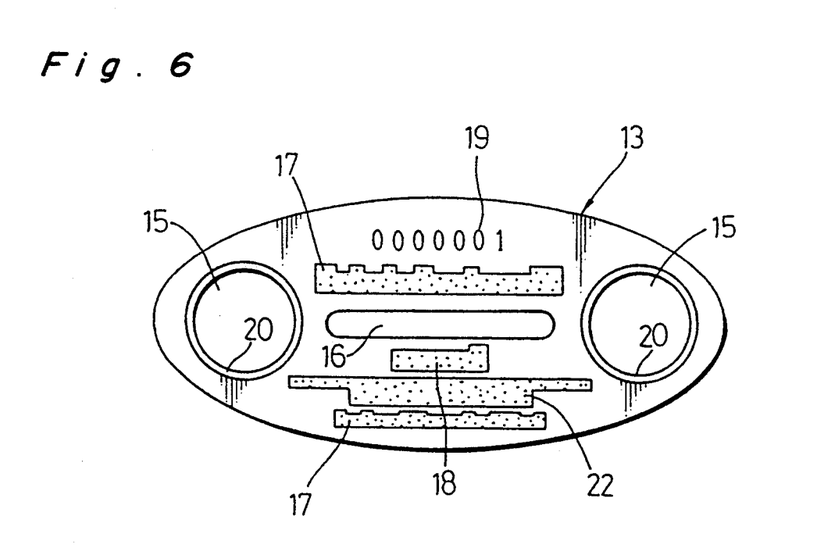
FIG. 6 is a plan view of a name plate.

As shown in FIGS. 1 and 6, reference numeral 13 denotes a name plate made of a metallic material which is attached to a generally intermediate portion of the outer surface of the main wall 2, including the right and left drive shaft insertion holes 3, after assembling the case body 1. In this example, the name plate 13 is made of aluminum plate and the schematic shape thereof is formed to be an elliptical one in plan view by press molding.

The name plate 13 has a pair of right and left shaft insertion openings 15, 15 defined in the right and left portions thereof corresponding to the right and left drive shaft inserting holes 3 in a penetrating manner. In the intermediate portion of the name plate 13, there is defined a window hole 16 elongated in the right to left direction corresponding to the convex portion 12 between the right and left shaft inserting openings 15, 15 in a penetrating manner by punching.

As shown in FIG. 6, the name plate 13 has a label function with an index of specification 17 indicating such as a kind and length of a tape and a source index 18, such as a name of the maker, formed on the outer surface of the name plate 13, and on the outer surface of the name plate 13 there is also marked an identification production number 19 peculiar to the individual name plate 13 for identifying the tape cartridge.

Figure 3:
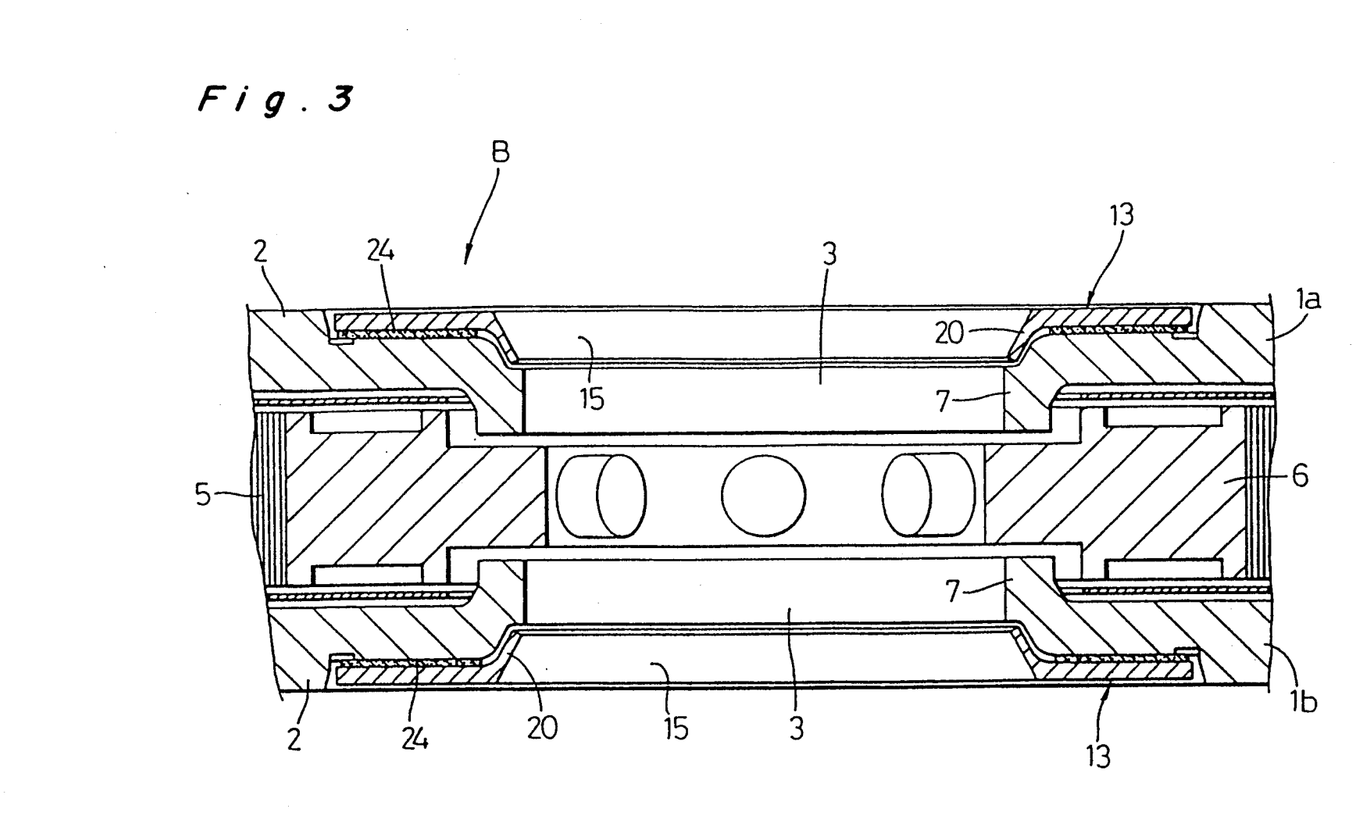
FIG. 3 is a sectional view cutting along the line A—A in FIG. 2.
Figure 4:
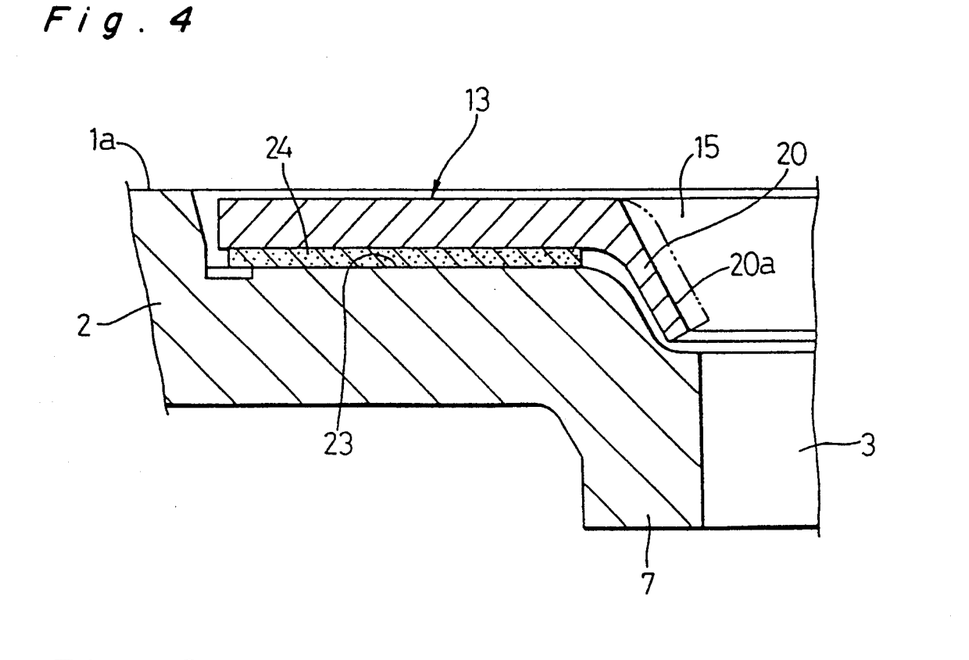
FIG. 4 is an enlarged sectional view showing a portion B shown in FIG. 3.

As shown in FIGS. 3 and 4, in the shaft insertion opening 15 defined in the name plate 13, there is provided a ring shaped shaft guide member 20 inwardly projected as one body within the inner peripheral portion of the shaft insertion opening 15. The shaft guide member 20 has a taper shaped inner free end portion folded to be projected inwardly with a guide surface 20a.

When the shaft insertion opening 15 is formed by molding in the name plate 13, the ring shaped shaft guide member 20, with its taper free end portion projected inwardly, is formed by a burring process. Subsequently, as shown in FIG. 4, the inner surface of the shaft guide member 20 is ground by a grinder at high revolutions of generally 10,000 r.p.m., whereby the shaft guide surface 20a is finished to a high accuracy to obtain luster of the metal. The guide surface 20a is conjoined with the outer surface of the name plate 13 through an edge corner with a sharp angle, so that the shape and size of the top edge of the shaft guide member 20, which corresponds to a drive shaft insertion start edge, is strictly defined.

The procedure of processing the name plate 13 is briefly described. First, an aluminum plate is prepared on which the indexes 17 and 18 are formed by an etching process so as to be colored, thereafter the aluminum plate is formed to a predetermined shape with a pair of openings 15 by punching through a press process, thereby obtaining a reinforced plate 13 in a blank state. Subsequently, the shaft insertion opening 15 is formed by a burring process, thereafter the shaft guide member 20 is ground by a grinder and is subjected to an alumite process so as to obtain the metallic luster. Subsequently, an index 22 of any small characters or figures is formed on the name plate 13 by a silk printing process and index 19, the identification production number, is marked on the name plate 13, as shown in FIG. 6.

In the outer surface of the main wall 2 of the case body 1, there is formed an elliptical concave portion 23 corresponding to the name plate 13 with a shape and size slightly larger than that of the name plate 13, so that the name plate 13 is installed in the concave portion 23 and fixed to the main wall 2 through an adhesive member 24, as shown in FIG. 4. In this attachment state of the name plate 13 to the concave portion 23, the outer surface of the name plate 13 is coincident with or slightly lower than the outer surface of the main wall 2.

In this way, the shaft guide member 20 projected from the inner peripheral portion of the shaft insertion opening 15 is attached closely in contact with the entrance peripheral portion of the drive shaft insertion hole 3, as shown in FIG. 4.

As shown in FIG. 5, the projected member 12 of the transparent window plate 11 is engaged in the window hole 16 defined in the name plate 13, so that the transparent window is provided for watching the state of the tape wound on the hubs 6, wherein the back surface of the name plate 13 is bonded to the bottom surface of the concave portion 23 defined in the main wall 2, including the transparent window plate 11, through an adhesive 24 in such a manner that the level of the outer surface of the projected member 12 is made coincident with that of the outer surface of the name plate 13. This is because, if the flat outer surface of the window plate 11 is simply covered with the name plate 13 having the window holes 16, without providing a projected portion 12 in the window plate 11, there is defined a concave portion by the window hole 16 in which thick dust can accumulate, so that it becomes hard to see inside the case body 1 through the window portion 16. In other words, the projected member 12 engaged in the window hole 16 prevents the entry of dust in the window hole 16.

Furthermore, the thickness of the main wall 2 is made approximately 1.8 mm, the thickness of the name plate 13 is made 0.4 mm and the length thereof in the right to left direction is made approximately 62 mm, and the length thereof in the longitudinal direction is made approximately 27 mm. The depth of the concave portion 23 is made 0.6 to 0.7 mm. Accordingly, in the attachment state of the name plate 13 in the concave portion 23, the outer surface of the name plate 13 is set to be approximately 0.1 mm lower than the outer surface of the main wall 2.

According to the first preferred embodiment of the tape cartridge, even in the case that there occurs a molding deformation in the upper and lower halves 1a and 1b, the name plate 13 can be obtained with high accuracy through the press process and grinding process, securing the shape and size of the shaft insertion openings 15, 15 with a distance between the center axes with high accuracy. Even though the tape cartridge is placed under a high temperature condition, since the coefficient of thermal expansion of the metallic name plate 13 is smaller than that of the case body 1 made of thermoplastic materials such as styrol resin, the shape and size of the name plate 13 can be also formed with high accuracy.

Even in the case that the name plate 13 is heated under such as an exposure to the direct sun, the thermal conduction is prevented by the plastic main wall 2 and the thermal influence directly applied on the hubs 6 and tape 5 in the case body 1 can be prevented as well.

In addition, if the case body 1 is formed by molding of plastic material with a metallic name plate inserted and buried therein, there occurs a warp deformation due to the difference of the coefficients of the thermal expansion between the plastic case body and the metallic reinforced name plate. In the first preferred embodiment according to the present invention, the name plate 13 of metallic material is bonded to the outer surface of the main wall 2 of the case body 1 through the adhesive 24. Therefore, there occurs a sliding displacement between the main wall 2 and the name plate 13 having different coefficients of thermal expansion respectively, thereby preventing the occurrence of a warp due to thermal deformation between the name plate 13 and the main wall 2.

As described above, the specification index 17 and the index of the source 18 are formed in three-dimension on the name plate 13 by an etching process, and the index of the identification production number 19 is formed in three-dimension by a marking method utilizing a quality of the metal. Accordingly, defacement of the various indexes 17 to 19 so as to render them unreadable can be prevented due to contact with other members, improving the durability of the indexes formed on the name plate 13.

Figure 8:
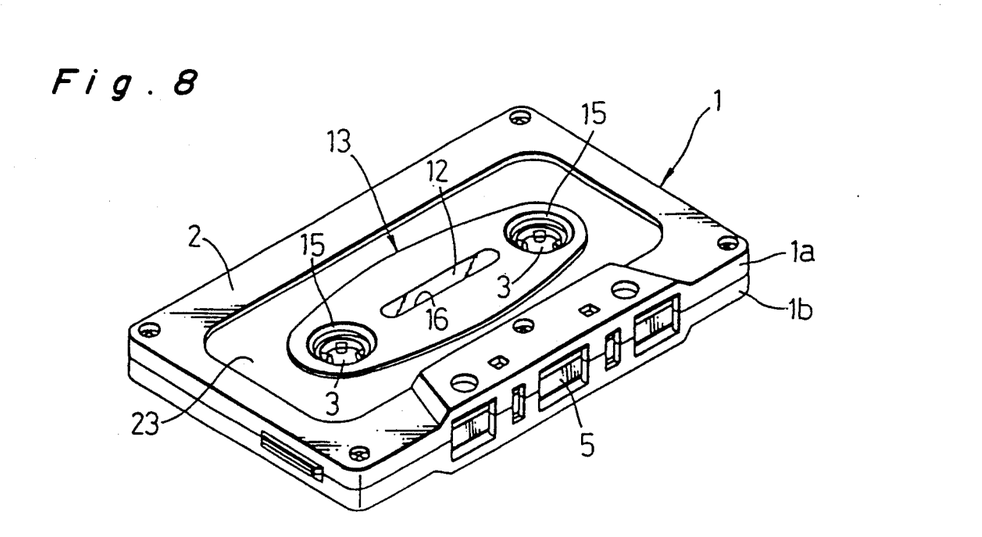
FIG. 8 is a perspective view showing a second embodiment of a tape cartridge according to the present invention.

A second preferred embodiment of a tape cartridge according to the present invention is shown in FIG. 8. The main wall 2 of the case body 1 has a wide concave portion 23 defined on the outer surface of the main wall 2 covering almost the entire part of the surface thereof. The name plate 13 is bonded to the bottom surface of the concave portion 23. Any shape of the concave portion 23 and name plate 13 may be formed. The other constitution of the tape cartridge is similar to that of the first embodiment.

Figure 9:
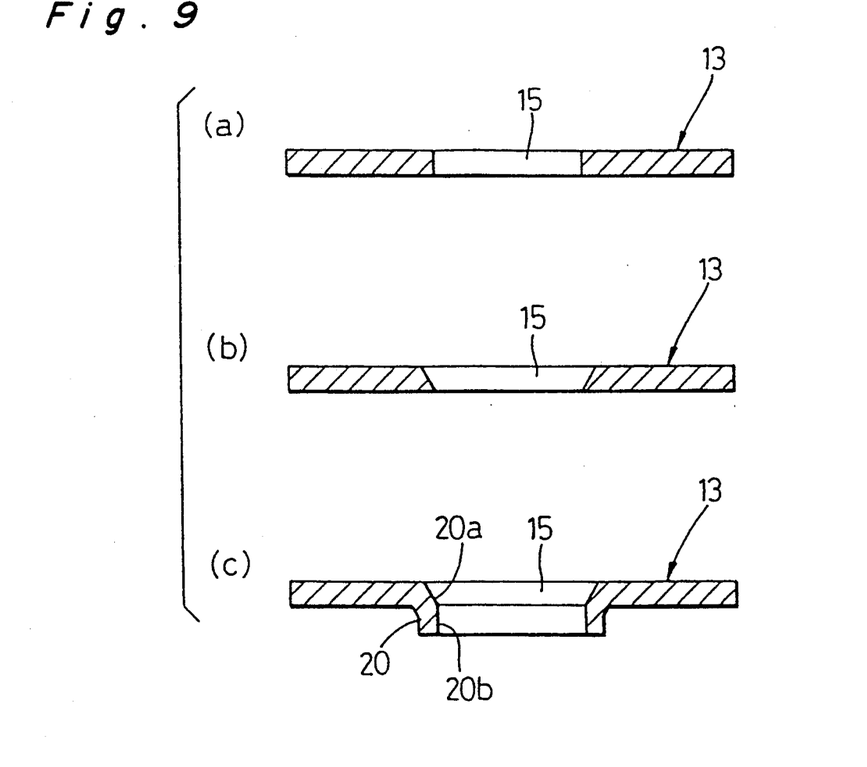
FIGS. 9(a), 9(b) and 9(c) are longitudinal sectional side views showing modified embodiments with respect to a name plate according to the present invention.

Modified examples of the shaft guide member 20 for defining the shaft insertion opening 15 formed in the name plate 13 are shown in FIGS. 9(a), 9(b) and 9(c).

In FIG. 9(a), there are formed a pair of holes in the name plate 13 by punching and the peripheral inner side walls of the punched holes are finished, whereby the shaft insertion openings 15 are formed.

In FIG. 9(b), the inner side walls of the punched holes shown in FIG. 9(a) are ground to be taper in shape, whereby the shaft insertion openings 15 are formed.

In FIG. 9(c), there are formed a pair of shaft guide members 20 each formed on the peripheral side wall of the shaft insertion opening 15 defined in the name plate 13 by such as a deep drawing process in such a manner that the shaft guide member has a taper shaped guide surface 20a and a vertical surface 20b projected downward from the taper portion 20a, whereby the shaft guide member 20 is extended from the inner peripheral wall of the drive shaft insertion hole 3 to the inner side wall of the flange member 7.

The attachment of the name plate 13 to the main wall 2 of the case body 1 may be performed by engaging a projected member into a hole, wherein the projected member and the hole for engagement may be formed on any one of the name plate 13 and the main wall 2, respectively.

Moreover, in the first embodiment, the name plate 13 may be attached to any portion, such as a peripheral side wall of the case body 1, instead of the main wall 2.

When the name plate 13 is made of metallic material, the metallic material is not limited to aluminum and stainless steel, copper, steel and other metals may be used as the name plate material, and the metallic name plate 13 may be formed by electroforming.

Although the thickness of the name plate 13 may be set to any value so long as the thickness is smaller than that of the main wall 2, it is preferable that the thickness of the name plate 13 be set to ⅔ to 1/5 of the thickness of the main wall 2.

When the name plate 13 is made of a plastic material, harder than that of the case body 1, the name plate 13 may be made of phenol resin containing glass fiber, for example. In this case, only a production lot number may be formed instead of forming the production number index 19 or at least any one of the indexes 17 and 18 of the usage way and source may be marked.

In addition, although the name plates 13, 13 are attached to the top and bottom main walls 2, 2 of the upper and lower halves 1a and 1b respectively, only one name plate 13 may be attached to any one of the upper and lower halves 1a and 1b.

Moreover, the tape guide block member 10 shown in FIG. 7 may be also formed as one body with the upper and lower halves 1a and 1b.

Moreover, the transparent window plate 11 may be formed of another member other than that of the main wall 2 of the case body 1 and may be fixed to the main wall by ultrasonic welding after assembling the case body 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape cartridge comprising:

a case body of plastic material composed of upper and lower halves, each half having a main wall in which there is defined at an intermediate portio thereof of a pair of drive shaft insertion holes in right and left portions thereof, said case body including two pairs of upper and lower flange members inwardly projected from inner peripheral portions of said drive shaft insertion holes continuous with said main wall, said main wall of said case body having a transparent window plate made of transparent plastic material integrally formed with said main wall by bicolor molding of said upper and lower halves of said case body, between said right and left drive shaft insertion holes, such that the state of the wound tape can be seen through said window plate, said window plate having an elevated portion elongated in a right to left direction projected outward from an intermediate portion of said window plate;

a pair of hubs for winding a tape therebetween, which are rotatably installed in positions corresponding to said drive shaft insertion holes in said case body, displacement of said hubs being regulated by said flange members; and at least one name plate made of material harder than said plastic material of said case body, said name plate being attached to an outer surface of at least one of said main walls of said case body inclusive of said right and left drive shaft insertion holes, said name plate having a window hole elongated in a right to left direction positioned between said right and left shaft insertion openings in an intermediate portion of said name plate, said position of said window hole corresponding to said elevated portion of said window plate, said name plate having one or more indexes formed on an outer surface thereof and having a pair of right and left shaft insertion openings defined therein, positions of said shaft insertion openings corresponding to said drive shaft insertion holes defined in said case body, said at last one name plate having a pair of ring shaped shaft guide members, each member of said pair having a tapered portion with a guide surface inwardly projected from an inner peripheral portion of each of said shaft openings, said shaft guide members being attached closely in contact with said inner peripheral portions of said drive shaft insertion holes, wherein in said outer surface of said main wall there is formed an elliptical concave portion corresponding in shape to that of said name plate having a size slightly larger than that of said name plate so that said name plate may be installed in said concave portion and fixed to said main wall through an adhesive member, wherein an outer surface of said name plate is coincident with or slightly lower than said outer surface of said main wall.

2. The tape cartridge according to claim 1, wherein said thickness of said name plate is smaller than that of said main wall.

3. The tape cartridge according to claim 2, wherein said thickness of said name plate is set to ⅔ to 1/5 of the thickness of said main wall.

4. The tape cartridge according to claim 1, wherein said transparent window plate is formed of a member other than that of said main wall of said case body, said window plate member being fixed to said main wall by ultrasonic welding after assembling said case body.

5. The tape cartridge according to claim 1, wherein said name plate comprises a metallic plate having a schematic shape formed to be elliptical in plan view.

6. The tape cartridge according to claim 5, wherein said name plate comprises an aluminum plate.

7. The tape cartridge according to claim 5, wherein a specification index and a source index indicating the source of said tape cartridge are provided in three-dimension on said name plate, and an index of an identification production number is formed in three-dimension by a marking method utilizing a quality of metal.

8. The tape cartridge according to claim 1, wherein said name plate comprises a plastic material harder than said plastic of said case body.

9. The tape cartridge according to claim 8, wherein said name plate comprises a phenol resin containing glass fiber.

10. The tape cartridge according to claim 1, wherein said guide surface of said guide member is conjoined as one body with said outer surface of said name plate through an edge corner, and a top edge of said shaft guide member corresponds to a drive shaft insertion start edge.

11. The tape cartridge according to claim 1, wherein said elevated portion of said transparent window plate is engaged in said window hole defined in said name plate, so that said transparent window is provided for watching the state of the tape wound on said hubs, wherein a back surface of said name plate is bonded to a bottom surface of a concave portion of said main wall including said transparent window plate through an adhesive, in such a manner that an outer surface of said elevated portion of said window plate is made coincident with that of said outer surface of said name plate.

12. The tape cartridge according to claim 1, wherein said shaft guide members are formed on peripheral side walls of said shaft insertion openings defined in said name plate by a deep drawing process in such a manner that each shaft guide member has a taper shaped guide surface and a vertical surface projected downward from said taper guide surface, whereby said shaft guide members are projected from inner peripheral walls of said drive shaft insertion holes extended to inner side walls of said flange members.

* * * * *